(12) United States Patent
Hanns et al.

(10) Patent No.: US 8,011,112 B2
(45) Date of Patent: Sep. 6, 2011

(54) METHOD AND APPARATUS FOR DETERMINING POSITIONS

(75) Inventors: Günther Hanns, Widnau (CH); Heinz Lippuner, Rebstein (CH)

(73) Assignee: Leica Geosystems AG, Heerbrugg (CH)

( * ) Notice: Subject to any disclaimer, the term of this patent is extended or adjusted under 35 U.S.C. 154(b) by 949 days.

(21) Appl. No.: 11/948,731

(22) Filed: Nov. 30, 2007

(65) Prior Publication Data

US 2008/0140249 A1 Jun. 12, 2008

(30) Foreign Application Priority Data

Dec. 7, 2006 (CH) ...................................... 1992/06

(51) Int. Cl.
*G01D 5/347* (2006.01)
(52) U.S. Cl. ...................................................... 33/706
(58) Field of Classification Search ................ 33/706
See application file for complete search history.

(56) References Cited

U.S. PATENT DOCUMENTS

| | | | | |
|---|---|---|---|---|
| 4,529,964 A * | 7/1985 | Minami et al. | .................. | 341/13 |
| 4,654,527 A * | 3/1987 | Schmitt | .................... | 250/237 G |
| 4,786,891 A * | 11/1988 | Ueda et al. | ...................... | 341/13 |
| 4,793,067 A * | 12/1988 | Reimar et al. | .................. | 33/707 |
| 5,068,529 A * | 11/1991 | Ohno et al. | ............... | 250/231.18 |
| 5,129,725 A * | 7/1992 | Ishizuka et al. | ............... | 356/617 |
| 5,235,181 A * | 8/1993 | Durana et al. | ........... | 250/231.18 |
| 5,332,895 A * | 7/1994 | Rieder et al. | ............. | 250/231.14 |
| 5,539,993 A * | 7/1996 | Kilpinen et al. | ................. | 33/706 |
| 5,783,817 A * | 7/1998 | Gohring | ..................... | 250/231.14 |
| 6,031,224 A * | 2/2000 | Peterlechner | ............ | 250/231.13 |
| 6,093,928 A * | 7/2000 | Ohtomo et al. | .......... | 250/231.13 |
| 6,158,132 A * | 12/2000 | Kofink et al. | .................. | 33/1 PT |
| 6,170,162 B1 * | 1/2001 | Jacobsen et al. | ............. | 33/1 PT |
| 6,175,414 B1 * | 1/2001 | Holzapfel et al. | ............. | 356/620 |
| 6,293,021 B1 * | 9/2001 | Freitag et al. | .................. | 33/1 PT |
| 6,311,401 B1 * | 11/2001 | Neckel et al. | .................. | 33/1 PT |
| 6,392,224 B1 * | 5/2002 | Holzapfel et al. | ........ | 250/231.13 |
| 6,438,860 B1 * | 8/2002 | Glimm | ............................ | 33/707 |
| 6,577,984 B1 * | 6/2003 | Clairet et al. | .................. | 702/151 |
| 6,922,907 B2 * | 8/2005 | Rodi | ................................ | 33/707 |
| 7,112,781 B2 * | 9/2006 | Ch'ng et al. | ............. | 250/231.13 |
| 7,209,225 B2 * | 4/2007 | Inoue | ............................... | 356/138 |
| 7,499,827 B2 * | 3/2009 | Gordon-Ingram | ............ | 702/150 |
| 7,875,844 B2 * | 1/2011 | Sheu et al. | ............... | 250/231.16 |
| 7,903,262 B2 * | 3/2011 | Wagner et al. | ................ | 356/616 |
| 2002/0139920 A1 * | 10/2002 | Seibel et al. | ............... | 250/208.1 |

* cited by examiner

*Primary Examiner* — Sath V Perungavoor
(74) *Attorney, Agent, or Firm* — Maschoff Gilmore & Israelsen

(57) ABSTRACT

For determining positions of a support having a bar code relative to a sensor array, the position of lines in the region of the sensor array is determined at least once and a position is determined therefrom. Thereafter, at least one line of the bar code is selected, a displacement of the position of the at least one selected line in the region of the sensor array is registered and the actual position is calculated therefrom by means of a previously determined position. An incremental and rapid measurement is thus permitted with a bar code and a sensor array.

12 Claims, 1 Drawing Sheet

Direction of rotation

Direction of rotation

METHOD AND APPARATUS FOR DETERMINING POSITIONS

BACKGROUND

The invention relates to a method according to a method for determining positions of a bar code on a support relative to a sensor array and an apparatus for determining positions.

In many applications, a support having at least one bar code trace and a sensor arrangement for registering at least one piece of bar code information are used for determining relative positions between two elements. The registered bar code information permits the determination of the sensor position relative to the bar code or to the support having the bar code. In the determination of the linear positions, linear bar codes or graduations are used. In the determination of angular positions, bar codes in the form of circular graduations are used.

For position determination, there are firstly solutions which directly determine the absolute position and secondly those which determine a starting position and incremental information. The bar code traces are adapted to the respective solution.

Position determinations with incremental information must start from an exactly detectable zero point and exactly detect movements in both directions. The direction of movement is determined, for example, via the phase position between the signals of two sensors arranged offset along the bar code. For high accuracy, extremely small bar spacings, a plurality of traces side by side and/or interpolation methods have to be used.

In the determination of an absolute position, codes on a plurality of traces, codes on one trace, readings with a sensor array, for example a diode array, or dynamic readings, for example with a rotating circular graduation, can be used.

An angular position can be exactly determined, for example, by means of a circular graduation and a sensor array extending over a section of the circular graduation, in particular a diode array. For this purpose, the circular graduation is divided, for example, into absolutely coded intervals, the sensor array reading the interval number and deriving a coarse angle determination therefrom. In order to obtain an exact angle value, the position of an interval mark relative to the sensor array is determined from the intensity values of the sensor array.

The documents EP 085 951 B1 and DE 199 39 643 A1 describe various solutions for determining the position of the interval mark. According to EP 085 951 B1, the centre of gravity of the interval mark is determined. In DE 199 39 643 A1, the position of the interval mark is determined by detecting the flank positions of many graduation lines and determining a single precise value therefrom.

For exact absolute position determinations, evaluation times which are too long in the case of various applications are required.

DE 35 28 955 A1 discloses an angle measurement for geodetic devices, in which a rotating graduated circle comprises both an absolutely coded graduation and an incremental graduation. The magnitude of the angle is determined from readings of the two graduations. The effort for the two graduations and the two readings is too great.

DE 41 25 865 A1 discloses a solution in which an absolute position determination is also permitted with a plurality of incremental graduations which run side by side and have different pitches.

DE 44 36 784 A1 discloses a solution in which an incremental line graduation, i.e. a trace, simultaneously comprises a code which permits an absolute position determination. The code is formed by virtue of the fact that the lines of the graduation have different widths but their centre lines have constant spacings. This absolute code is read by a CCD array. An incremental read head permits the incremental position determination. The absolute and incremental position determination can be tested mutually for plausibility. An eccentric error can also be eliminated. If appropriate, the absolute position determination is carried out only in relatively large time intervals and the incremental position determination is used in between.

SUMMARY OF THE INVENTION

Because the known solutions are complicated and slow, the object of the invention is to find a simple and rapid solution which always permits an accurate position determination.

The object is achieved by the features of the independent Claims. The dependent claims describe alternative or advantageous embodiments.

DETAILED DESCRIPTION

Figure 1:
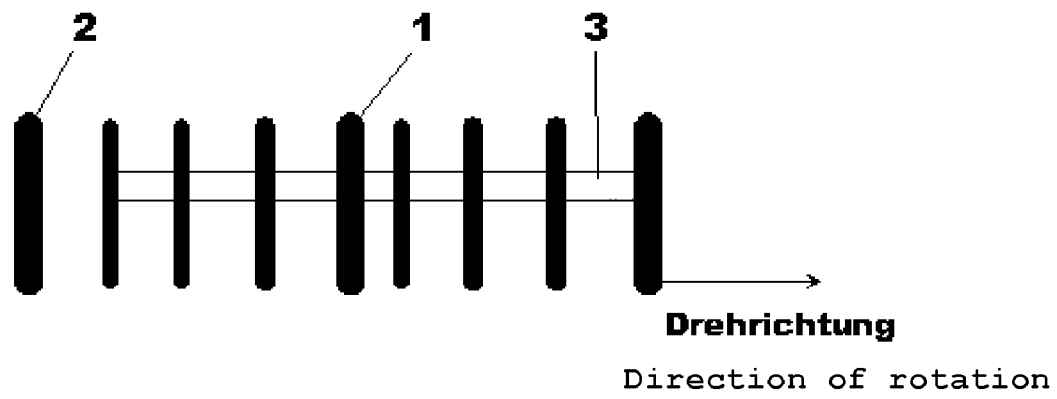
FIG. 1 shows vertical lines of a bar code.

In the achievement of the inventive object, it was recognised that, in many applications, an exact reading is desired not only in the stationary state but also during rotation or displacement. In the stationary state, a slow position determination from the absolute code is expedient. In the moving state, however, a rapid measurement must be carried out. In order for the inventive determination apparatus to have a simple design, the graduation for the absolute determination is used for the increment determination. A further graduation can be dispensed with. In order that the reading is effected rapidly, only a part of the sensor signals is evaluated.

In the known increment determinations, the movement of equidistant lines is scanned on the basis of the light/dark change at one point or with one sensor. It is not possible with lines of an absolute code. Because the lines of absolute codes are different distances apart, a novel solution has to be found for acquiring a piece of incremental information.

In the case of absolute graduations with interval marks, for example in the form of lines having a special width, the movement of an interval mark in the region of the sensor array can be registered. All that is necessary is to track the position of an interval mark. Instead of tracking an interval mark, it is also possible to track an arbitrary line or the position of the centre of gravity of a plurality of lines. The centre of gravity of n lines is calculated and the change in the centre of gravity during the movement is tracked. The accuracy of the determination of the centre of gravity can be adapted to the requirements, for example by the accuracy of digitization (number of bits). If the tracked interval mark or the tracked centre of gravity enters an edge reason of the sensor array, there is a change over to the tracking of a more centrally located interval mark or a more centrally located centre of gravity.

In an embodiment with an absolute code, according to a first variant, a line is therefore selected and tracked as long as it is visible in the region of the sensor array, in particular of a diode array. Shortly before it emerges from the sensor array, there is a jump to the next line of the same type. In a second variant, the movement of the centre of gravity of n lines on a sensor array is registered and, if appropriate, the lines are characterized so that they can be tracked.

The absolute code can be registered in movement-free times. During movement, preferably only the inventive incremental registration is carried out. Thus, an incremental and rapid measurement is permitted by an arrangement for an absolute position determination by means of a sensor array during movement.

In an embodiment with an incremental code, in the first variant, a line is likewise selected and tracked as long as it is visible in the region of the sensor array. The difference between this inventive increment determination and a known increment determination is that now the movement of at least one line on the sensor array is tracked. In the known increment determinations, only the passage of lines through a sensor position is registered. With the inventive increment determination, very fine graduations can be dispensed with. For the accuracy, it is important that the sensor array permits a fine resolution of the movement of the bar code together with the imaging of the bar code.

The method is carried out using an increment determination device which, for the determination of the actual position, selects at least one line 1, 2 of the absolute code or, if appropriate, of an incremental code, registers the shift in position of the at least one selected line 1, 2 in the region the sensor array 3 and calculates the changed position therefrom by means of a previously determined position.

The drawings explain the invention with reference to three working examples. They schematically show one section each of a bar code and a sensor array. The bar code is shown in each case as a linear code but should also be understood as meaning a section of a circular graduation. The spacings between the lines shown are of different magnitude because this is an absolute code with coded intervals. For the coarse determination of a position, an interval number can be read. In order to obtain an exact position value, the position of an interval mark relative to the sensor array is determined from the intensity values of the sensor array.

In the case of an increment code, the distances between the lines would always be of the same magnitude. In order to be able to determine a zero point, a corresponding zero point mark would have to be provided. After the detection of the zero point, the change of the position of at least one line on the sensor array can be determined from the intensity values of the sensor array.

An exact starting position is determined at least once by means of the absolute code or of a zero point mark or by setting a starting direction by means of software. By means of the method described with reference to the figures, lines of a bar code can be used for an increment determination with a sensor array.

FIG. 1 shows vertical lines of a bar code. For determining the actual position of the support having the bar code, relative to a sensor array 3, at least one selected line 1 each is tracked during successive time segments. Positions of the at least one selected line 1 are registered by the sensor array in predetermined time intervals and the actual position is calculated therefrom by means of a previously determined starting position. Because the bar code moves relative to the sensor array 3 according to the indicated direction of movement, in particular direction of rotation R the line 1 is moved out of the region of the sensor array. Before or just when the line 1 disappears from the measuring window of the sensor array 3, there is a change over to the tracking of a line 2 which has just entered the measuring window for a subsequent time segment.

Any line can be tracked. In the case of an absolute code, for example, an interval mark is tracked. Because only few interval marks are simultaneously in the measuring window of the sensor array 3, there is little danger that the position of another line would accidentally be registered from one position determination to the next. In order to keep the danger of confusion small, a tracked line can also be characterized over at least a distance to an adjacent line, but preferably over two distances to lines adjacent on both sides. If the sensor array is evaluated with a high frequency and the movement of the bar code is slow the position of the tracked line changes so slowly that it is always the closest line from evaluation to evaluation.

The sensor array 3 is preferably a diode array. Of course, all linear sensor arrangements which make it possible to detect the position of a line can be used.

Figure 2:
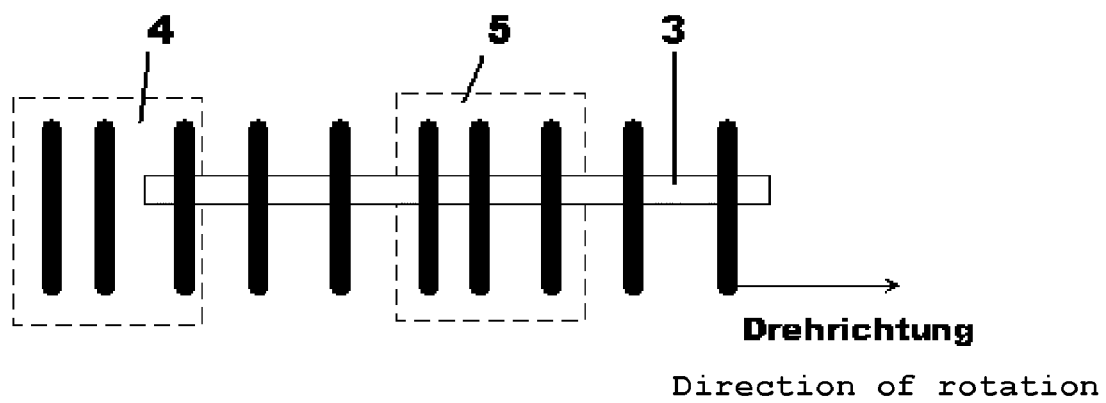
FIG. 2 shows an embodiment in which, instead of individual lines, line packets are tracked.

FIG. 2 shows an embodiment in which, instead of individual lines, line packets are tracked. On the basis of the indicated direction of movement, in particular direction of rotation R, an actually tracked line packet 5 will emerge on the right from the measuring window of the sensor array 3. For further position determination, there is then a change over to the tracking of a further line packet 4.

For the detection of a selected line packet, it is possible to use at least one characteristic property of the packet, for example the relative spacings between the lines and/or line widths. If only one line packet having the same line spacing can be present at a time in the measuring window of the sensor array 3, the accidental determination of a position of another line packet is ruled out. The position of a line packet is specified, for example, as the position of the centre of gravity.

This embodiment is not advantageous for incremental codes with equidistant lines because the line packets do not differ from another.

Figure 3:
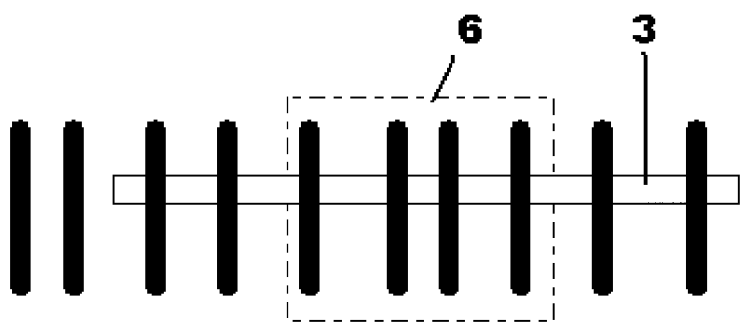
FIG. 3 shows a preferred embodiment in which a partial window is defined on the measuring window of the sensor array.

FIG. 3 shows a preferred embodiment in which a partial window 6 is defined on the measuring window of the sensor array 3. Within this partial window 6, the displacement of the centre of gravity of the lines present therein is tracked. When a new line enters the partial window 6, a new overall centre of gravity is determined with this line and tracked. In an analogous manner, a new overall centre of gravity without this line is determined and further tracked on emergence of a line from the partial window 6. This embodiment can be used with all bar codes.

The change of the centre of gravity corresponds to the change from one line packet to another or from at least one line to another. On changing the centre of gravity, the number of lines in the fixed partial window 6 is generally incremented or decremented by one. If at the same time one line enters and one exits, the position of the centre of gravity changes abruptly without the number of lines in the partial window 6 changing.

If the spacings of the sensors of sensor array 3 are clearly smaller than the minimum distance between the lines or the lines projected onto the sensor array, the centre of gravity must not be changed uninterruptedly during current movements. The centre of gravity must be changed at the earliest when a line has passed over at least the number of sensors which lie between two lines.

The described use of a partial window comprises a passive choice of at least one line because the choice is made by the entry and exit of lines into or out of the fixed window 6. In the case of a passive choice, the processing effort for the active selection and correct tracking of at least one line within the overall measuring window of the sensor array 3 is absent. All that is necessary is to recognise the entry and exit of lines into and out of partial window 6, which leads to an abrupt displacement of the centre of gravity.

The partial window 6 is chosen so that at least one line is always present therein. If only a few lines are present in the partial window, the processing effort for determining the position of the centre of gravity is smaller. The window can be established according to various points of view. For example there should be very little image distortion, very little soiling of the sensors, a very fast read out time or optimal illumination.

The size and position of the partial window 6 are preferably fixed, but, if appropriate, the size and/or position is changed according to the respective measuring procedure.

We claim:

1. A method for determining positions of a bar code on a support relative to a sensor array, comprising:
   determining, by the sensor array, at least once the position of lines of the bar code in the region of the sensor array;
   determining a position therefrom, and the bar code trace forming an absolute code;
   selecting exactly one line of the bar code;
   registering displacement of the position of the exactly one selected line in the region of the sensor array; and
   determining the actual position therefrom by means of a previously determined position.

2. A method according to claim 1, wherein there is a change over to the tracking of the exactly one centrally located line if the exactly one tracked line enters an edge region of the sensor array.

3. A method according to claim 1, wherein a partial window is defined for the selection of the exactly one line on the sensor array, the center of gravity of the lines in the partial window being tracked for determining the displacement of the position and, on entry or exit of the exactly one line into or out of the partial window, there is a change over to the tracking of the new centre of gravity.

4. An apparatus for determining positions, comprising:
   a bar code on a support and including:
      a sensor array for registering at least one piece of bar code information, the sensor array making it possible to register the position of lines of the bar code in the region of the sensor array at least once for determining a position; and
      the bar code forming an absolute code;
   wherein an increment determination device is used which, for determining the actual position, makes it possible to select exactly one line of the bar code and to register a displacement of the position of the exactly one selected line in the region of the sensor array, it being possible to calculate the changed position therefrom by means of a previously determined position.

5. A method for determining positions of a bar code on a support relative to a sensor array, comprising:
   determining, by the sensor array, at least once the position of lines of the bar code in the region of the sensor array;
   determining a position therefrom, and the bar code trace forming an absolute code;
   selecting at least one line of the bar code;
   registering displacement of the position of an interval mark in the region of the sensor array; and
   determining the actual position therefrom by means of a previously determined position, wherein there is a change over to the tracking of at least one centrally located line if the at least one tracked line or the tracked centre of gravity enters an edge region of the sensor array.

6. A method according to claim 5, wherein a partial window is defined for the selection of the at least one line on the sensor array, the centre of gravity of the lines in the partial window being tracked for determining the displacement of the position and, on entry or exit of the line into or out of the partial window, there is a change over to the tracking of the new centre of gravity.

7. A method for determining positions of a bar code on a support relative to a sensor array, comprising:
   determining, by the sensor array, at least once the position of lines of the bar code in the region of the sensor array;
   determining a position therefrom, and the bar code trace forming an absolute code;
   selecting at least one line of the bar code;
   registering displacement of the position of centre of gravity of a plurality of lines in the region of the sensor array; and
   determining the actual position therefrom by means of a previously determined position.

8. A method according to claim 7, wherein the number of lines used for determining the centre of gravity is changed depending on the speed of movement of the centre of gravity, fewer lines being used in the case of a higher speed of movement and more lines being used in the case of a lower speed of movement.

9. A method according to claim 7, wherein there is a change over to the tracking of one centrally located centre of gravity if the tracked centre of gravity enters an edge region of the sensor array.

10. A method according to claim 7, wherein a partial window is defined for the selection of the at least one line on the sensor array, the centre of gravity of the lines in the partial window being tracked for determining the displacement of the position and, on entry or exit of the line into or out of the partial window, there is a change over to the tracking of the new centre of gravity.

11. An apparatus for determining positions, comprising:
    a bar code on a support and including:
       a sensor array for registering at least onepiece of bar code information, the sensor array making it possible to register the position of lines of the bar code in the region of the sensor array at least once for determining a position; and
       the bar code forming an absolute code;
    wherein an increment determination device is used which, for determining the actual position, makes it possible to select at least one line of the bar code and to register a displacement of the position of an interval mark in the region of the sensor array, it being possible to calculate the changed position therefrom by means of a previously determined position, wherein there is a change over to the tracking of at least one centrally located line if the at least one tracked line or the tracked centre of gravity enters an edge region of the sensor array.

12. An apparatus for determining positions, comprising:
    a bar code on a support and including:
       a sensor array for registering at least one piece of bar code information, the sensor array making it possible to register the position of lines of the bar code in the region of the sensor array at least once for determining a position; and
       the bar code forming an absolute code;
    wherein an increment determination device is used which, for determining the actual position, makes it possible to select at least one line of the bar code and to register a displacement of the position of a centre of gravity of a plurality of lines in the region of the sensor array, it being possible to calculate the changed position therefrom by means of a previously determined position.

* * * * *